US006964324B2

(12) United States Patent
Shimada et al.

(10) Patent No.: US 6,964,324 B2
(45) Date of Patent: Nov. 15, 2005

(54) DAMPER WITH MAGNETIC FLUID

(75) Inventors: Kunio Shimada, Akita (JP); Hideto Kanno, Honjyo (JP)

(73) Assignee: Tohoku Techno Arch Co., Ltd., (JP)

( * ) Notice: Subject to any disclaimer, the term of this patent is extended or adjusted under 35 U.S.C. 154(b) by 0 days.

(21) Appl. No.: 10/456,886

(22) Filed: Jun. 6, 2003

(65) Prior Publication Data
US 2003/0226728 A1 Dec. 11, 2003

(30) Foreign Application Priority Data
Jun. 11, 2002 (JP) ............................. 2002-170086

(51) Int. Cl.⁷ .............................................. F16F 9/53
(52) U.S. Cl. .................... 188/267.2; 188/267
(58) Field of Search ...................... 188/267, 267.1, 188/267.2

(56) References Cited
U.S. PATENT DOCUMENTS

| 4,049,985 | A | * | 9/1977 | Sudler ...................... 310/49 R |
|---|---|---|---|---|
| 4,942,947 | A | * | 7/1990 | Shtarkman ............... 188/267.2 |
| 5,263,558 | A | * | 11/1993 | Yamaoka .................... 188/267 |
| 5,283,234 | A | * | 2/1994 | Wang et al. ................. 505/150 |
| 5,354,488 | A | * | 10/1994 | Shtarkman et al. ...... 252/62.56 |
| 5,542,506 | A | * | 8/1996 | McMichael et al. ........ 188/267 |
| 6,382,369 | B1 | * | 5/2002 | Lisenker .................. 188/267.2 |
| 6,497,308 | B2 | * | 12/2002 | Lisenker .................. 188/267.2 |
| 2003/0217901 | A1 | * | 11/2003 | Carlson ...................... 188/267 |

* cited by examiner

Primary Examiner—Robert A. Siconolfi
(74) Attorney, Agent, or Firm—Hayes Soloway P.C.

(57) ABSTRACT

A damper in which magnetic particles are discouraged from settling irrespective of the kind of a magnetic fluid is provided. A damper is constituted of a vessel in which the magnetic fluid is accommodated and a slider (piston). As the piston, one that is made of a laminated body of a paramagnetic substance and a non-magnetic substance is used. When thus constituted, the magnetic particles stick to the piston. Accordingly, whatever magnetic fluid is used, the particles do not settle. The laminated body that is used as the piston has the non-magnetic substance at both ends thereof. When the laminated body is thus constituted, the magnetic particles sticks uniformly. When the laminated body has the magnetic substance at both ends, magnetic particles stick to both ends needle-like.

2 Claims, 5 Drawing Sheets

(a)

(b)

(c)

(a) FREQUENCY CHARACTERISTICS WHEN MAGNETIC FIELD IS NOT APPLIED (b) FREQUENCY CHARACTERISTICS WHEN MAGNETIC FIELD IS APPLIED

DAMPER WITH MAGNETIC FLUID

BACKGROUND OF THE INVENTION

1. Field of the Invention

The present invention relates to a damper that has a magnetic fluid and suppresses vibration from occurring.

2. Description of the Related Art

A magnetic fluid (MR fluid (magneto-rheological fluid), MCF fluid (magnetic composite fluid) and so on) is a solution in which, in a solvent, fine particles of high-permeability α-Fe having particle diameters in the range of from 1 to several μm are uniformly dispersed. The fine particles of iron and the solvent such as water and oil do not separate because surfaces of ferromagnetic fine particles are processed with a surfactant. When a magnetic field is applied to the magnetic fluid, the respective particles are magnetized and form chain-like clusters aligned in a direction of the magnetic field; the clusters generate the flow resistance of the fluid; and an increase in the apparent viscosity of the entire fluid results.

The magnetic fluid is used in a damper 110 constituted, for instance, as shown in FIG. 1. In FIG. 1, a piston 113 is immersed in a magnetic fluid 116, and, owing to the viscosity between the piston and the magnetic fluid, vibration of the piston is attenuated. A static magnetic field is externally applied with an electromagnet 120. The reason for the magnetic fluid being used in the damper is that when the strength of the magnetic field applied to the damper is varied with the electromagnet 120, the viscosity of the magnetic fluid can be varied, and thereby the characteristics of the damper can be controlled. Since the damper can be controlled owing to the control of the magnetic field, the dampers with the magnetic fluid are used in seismic control devices for controlling such as earth quake and so on.

However, in the damper with the magnetic fluid, there is a problem in that, with time, the magnetic particles contained in the fluid settle. Accordingly, magnetic fluids whose particles settle with difficulty are in development.

The object of the present invention is to provide a damper in which, irrespective of the kind of the magnetic fluid, magnetic particles are difficult to settle.

SUMMARY OF THE INVENTION

In order to achieve the above object, the invention provides a damper with a magnetic fluid; the damper comprises a vessel that accommodates the magnetic fluid, a slider that is disposed in the vessel, and an electromagnet that externally applies a magnetic field to the magnetic fluid; wherein the slider is a laminated body that is made of a magnetic substance and a paramagnetic substance and has non-magnetic substance at both ends thereof.

The magnetic field applied from the electromagnet can be a progressive magnetic field.

DESCRIPTION OF THE PREFERRED EMBODIMENTS

Embodiments according to the invention will be detailed with reference to the drawings.

Figure 2:
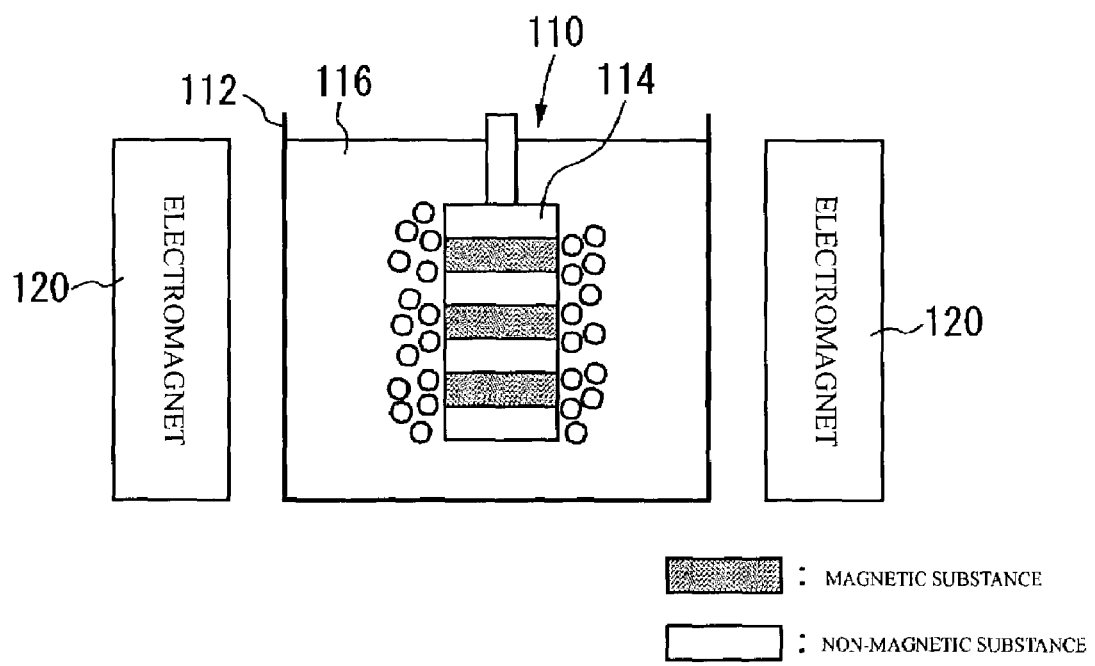
FIG. 2 is a diagram showing a constitutional example of a damper with a magnetic fluid according to the invention.

FIG. 2 is a diagram showing a damper 110 that is constituted of a vessel 112 in which a magnetic fluid 116 according to an embodiment of the invention is accommodated and a slider (piston) 114. As shown in FIG. 2, as the piston (slider) 114 of the damper 110, one obtained by laminating a paramagnetic substance and a non-magnetic substance is used. When the slider is thus configured, particles that are schematically shown in FIG. 2 with circles stick to the piston 114. Accordingly, whatever magnetic fluid is used, the particles do not settle. Both ends of the laminated body that is used as the piston are formed of the non-magnetic substance. The reason for this is to allow the magnetic particles to uniformly stick. When the both ends are formed of the magnetic substance, the magnetic particles stick needle-like at both ends thereof. The piston with the magnetic substance according to the invention can be used as a damper of the magnetic fluid thereto a steady magnetic field is applied from the electromagnet 120.

When a progressive magnetic field is externally applied, with the electromagnet 120, to the damper of the magnetic fluid having a piston made of the magnetic substance like this, in accordance with a frequency and an amplitude of the progressive magnetic field externally applied, a larger attenuation effect can be obtained.

Figure 3:
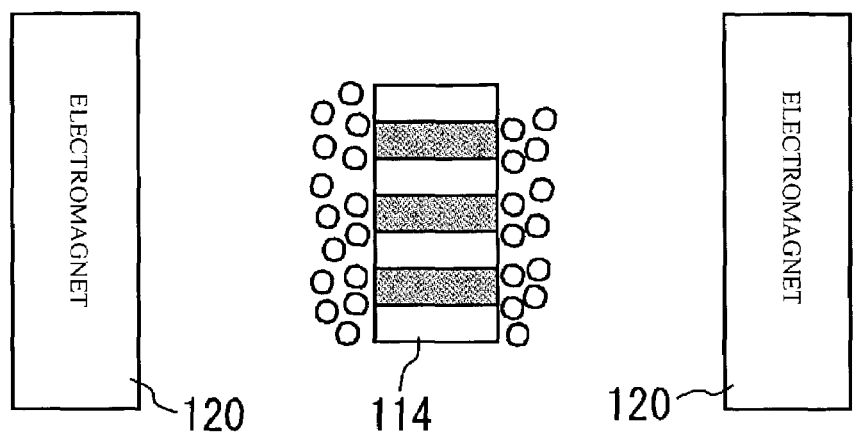
FIGS. 3A through 3C are diagrams for explaining situations when a progressive magnetic field is applied.
Figure 3:
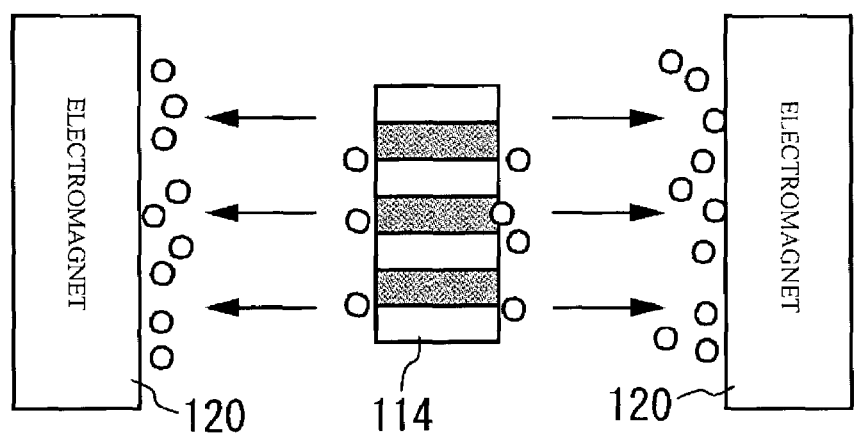
Figure 3:
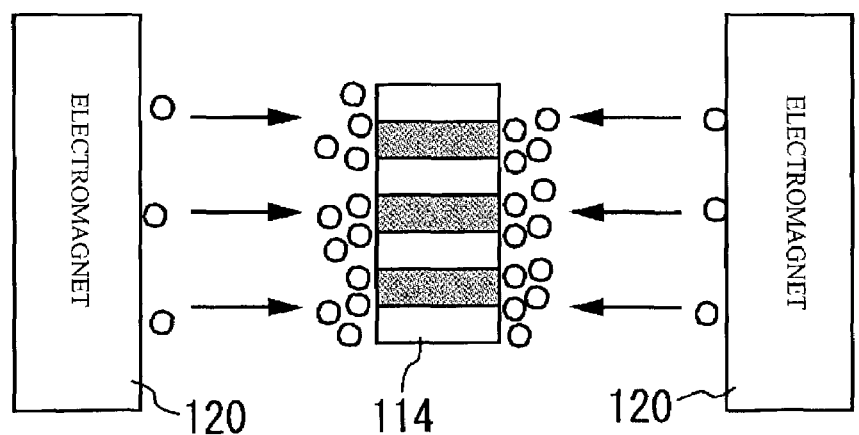

With reference to FIGS. 3A through 3C, a mechanism of the attenuation effect due to the progressive magnetic field that is externally applied and varies with time will be explained. When the progressive magnetic field that varies with time is applied from the electromagnet 120, one that is first in a state shown in FIG. 3A alternates a state shown in FIG. 3B where the particles leave the piston 114 and are drawn to the external magnetic field and a state shown in FIG. 3C where the particles are drawn to the piston 114. Thereby, the viscosity of the fluid varies; accordingly, the attenuation of the damper can be varied according to the frequency and the amplitude of the progressive magnetic field.

When a steady magnetic field is applied, as shown in FIG. 3B, the particles are drawn to the external magnetic field. In this case also, the viscosity of the magnetic fluid can be varied.

Figure 4:
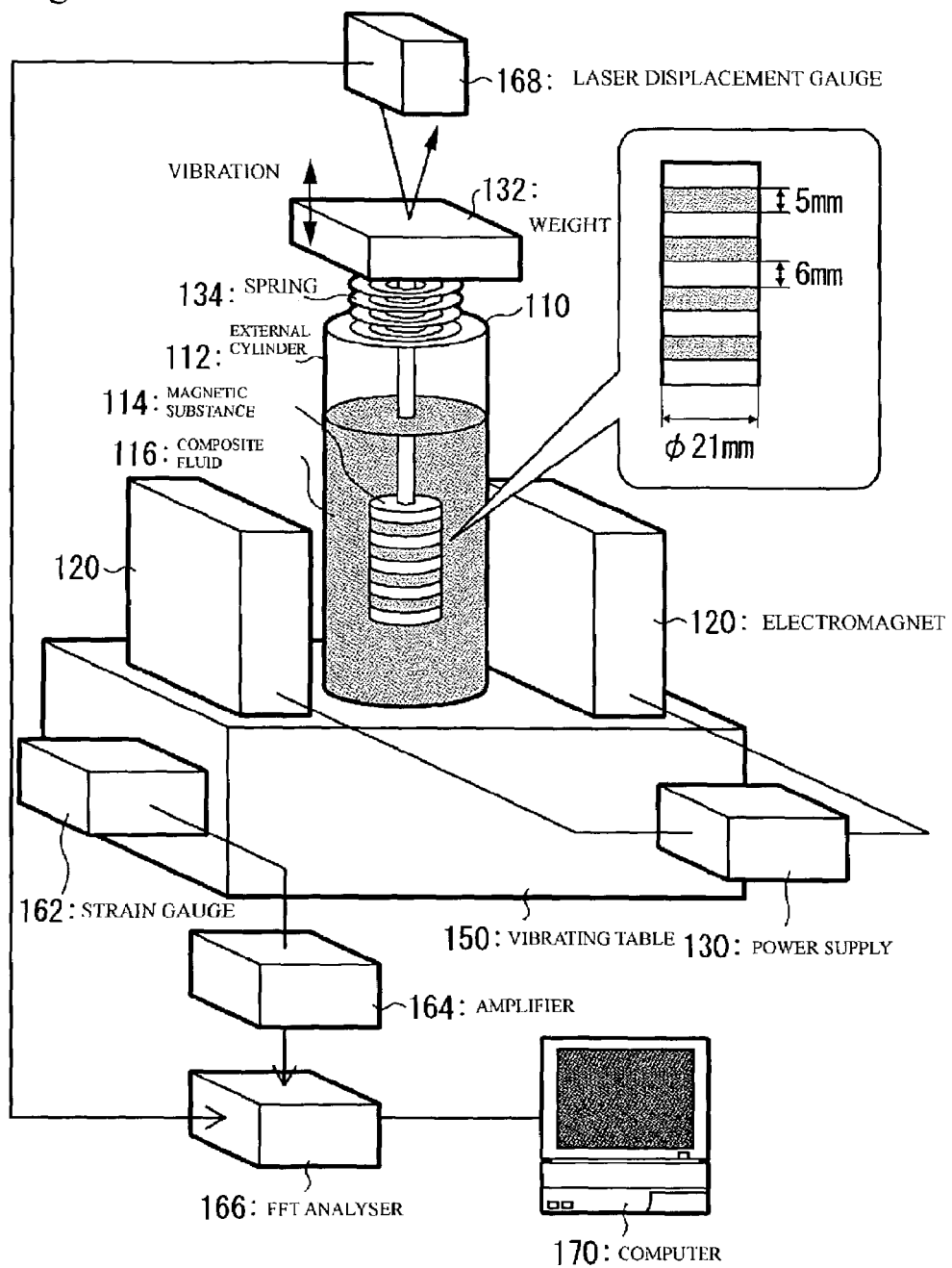
FIG. 4 is a diagram showing a constitution of a system with which the damper with the magnetic fluid is tested.
Figure 5:
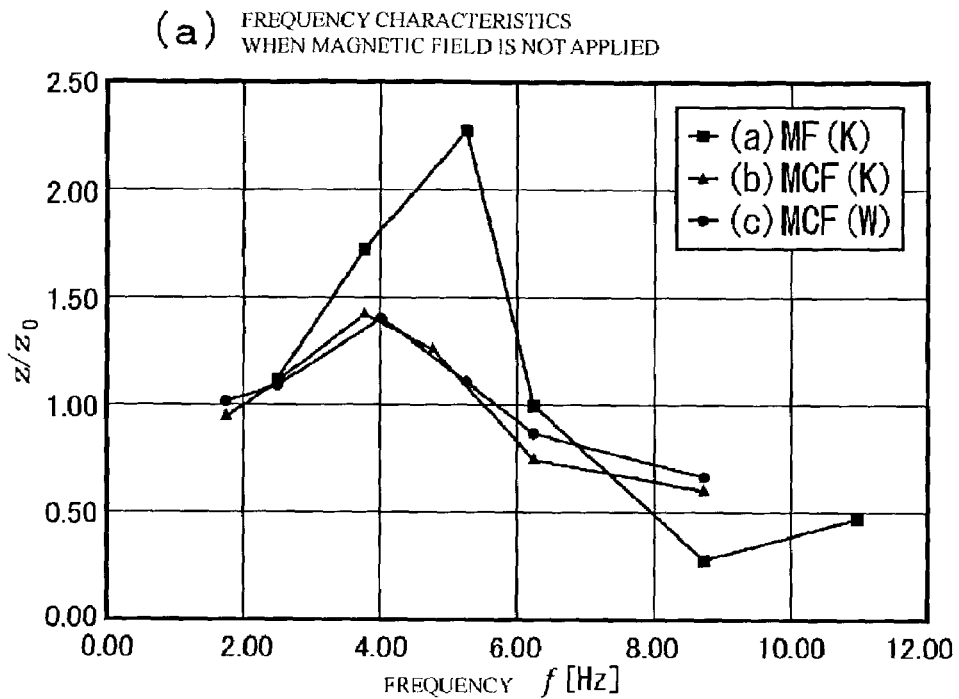
FIGS. 5A and 5B are diagrams showing the damper characteristics when the progressive magnetic field is not applied and applied, respectively.
Figure 5:
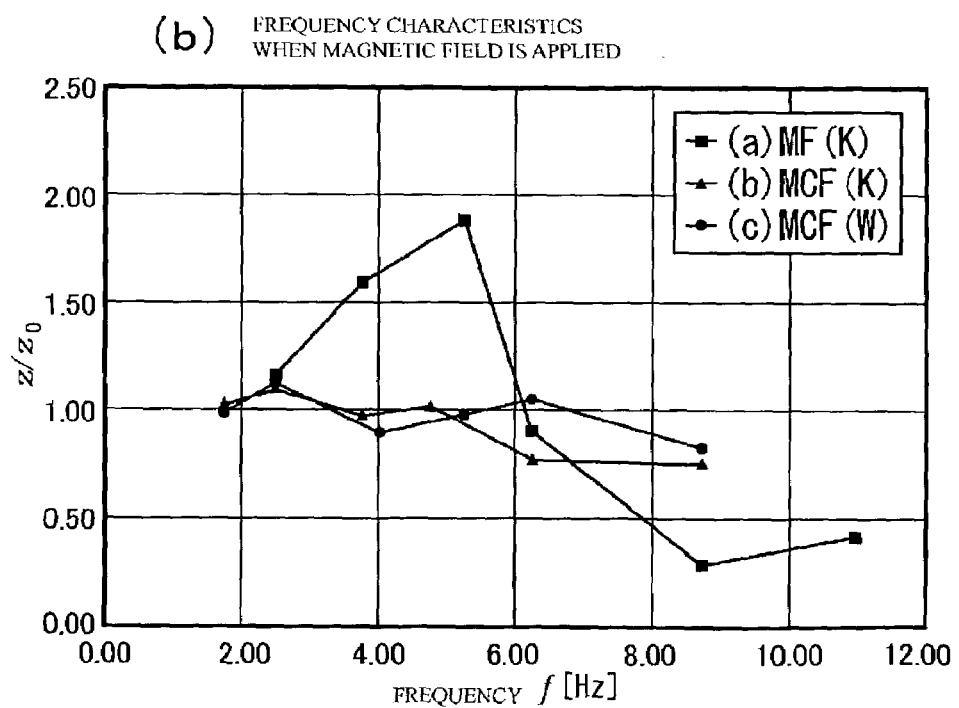

According to a system shown in FIG. 4, specifically, with various kinds of magnetic fluids, the damper characteristics were measured. Examples of results are shown in FIGS. 5A and 5B. In FIG. 4, a vibrating table 150 gives a vibration to the damper 110. The vibration of the vibrating table 150 is inputted through a strain gauge 162, an amplifier 164 and a FFT analyzer 166 into a computer 170. Furthermore, the vibration past the damper is inputted through a weight 132, a laser displacement gauge 168, and the FFT analyzer 166 into the computer 170.

As magnetic responsive fluid (composite fluid), (a) through (c) shown below were used.

(a) MF (K)

Kerosene-based magnetic fluid (dispersion particle: magnetite (particle diameter: 10 nm, and concentration: 50 percent by weight), dispersion medium: kerosene, and kinematic viscosity: substantially 2 $mm^2/s$).

(b) MCF (K)

Kerosene-based magnetic fluid (dispersion particle: magnetite (particle diameter: 10 nm, and concentration: 8.76 percent by weight), dispersion medium: kerosene, and kinematic viscosity: substantially 2 mm$^2$/s), and compounding ratio: 54.96 g.

Additive 1: kerosene (kinematic viscosity: substantially 1 mm$^2$/s), and compounding ratio: 62.4 g.

(c) MCF (W)

Water-based magnetic fluid (dispersion particle: magnetite (particle diameter: 10 nm, concentration: 8.76 percent by weight), dispersion medium: water (kinematic viscosity: substantially 2 mm$^2$/s), and compounding ratio: 32.32 g.

Additional dispersion fine particle: Iron (particle diameter: 1 μm, concentration: 6.38 percent by weight), and compounding ratio: 8 g.

Additive 1: water (kinematic viscosity: substantially 1 mm$^2$/s), and compounding ratio: 84.84 g.

Additive 2: sodium oleate, and compounding ratio: 0.2 g.

Additional dispersion fine particle: Iron (particle diameter: 1 μm, concentration: 6.38 percent by weight), and compounding ratio: 8 g.

Furthermore, an actually used system is a system of one degree of freedom in which the spring constant of a spring is 0.0058 kgf/mm and a weight is 60.4 g. An inner diameter of a cylindrical vessel is 25 mm and a diameter of a cylindrical piston is 21 mm. The paramagnetic substance of the piston is ferrite (500 gauss) having a thickness of 5 mm and the non-magnetic substance is acryl having a thickness of 6 mm. The paramagnetic substance is formed into 4 layers and the non-magnetic substance is formed into 5 layers. In this case, as a magnetic field externally supplied, a progressive magnetic field that varies with time (amplitude: I=10 A (the maximum magnetic field strength: 40 gauss) and frequency: 50 Hz) is supplied. At the resonation, an amplitude ratio $z_0/z$ becomes larger.

Examples of results of embodiments when the above mixture fluids are used are as shown in graphs in FIGS. 5A and 5B. The graphs show the frequency (f) dependency of amplitude ratio ($z_0/z$) when the substance that is immersed in the fluid is a magnetic substance (piston with permanent magnet).

It was observed that when the thus constituted damper was used, the particles did not settle over a long time.

Figure 1:
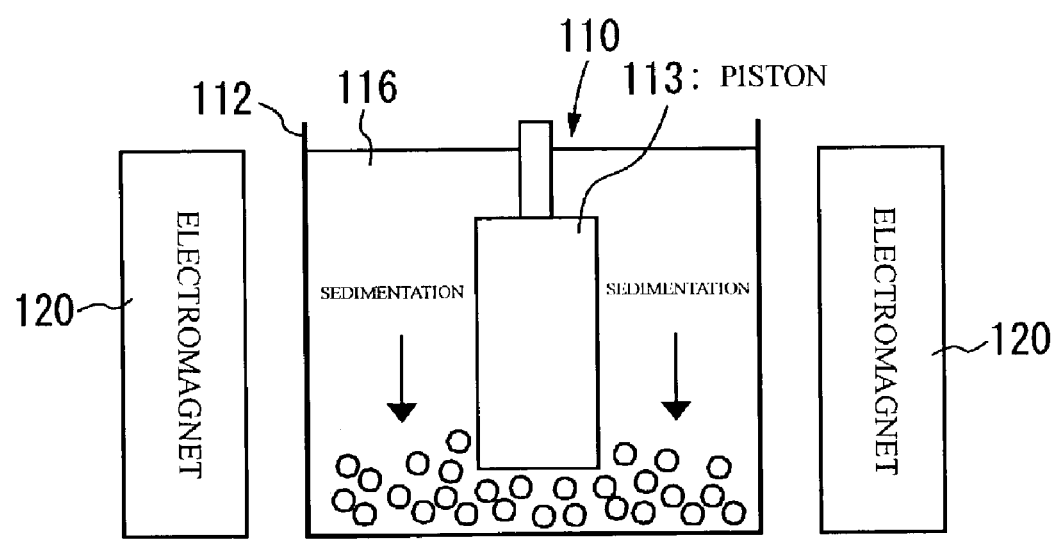
FIG. 1 is a diagram showing a constitutional example of a damper with an existing magnetic fluid.

Furthermore, when a progressive magnetic field is externally applied, since the particles stuck to the permanent magnet of the piston can be detached with the external magnetic field, an effect due to the magnetic field can be obtained. When the graph of the frequency characteristics when the magnetic field was not applied (FIG. 5A) and that when the magnetic field was applied (FIG. 5B) are compared, the attenuation effect of the amplitude due to the magnetic field at the resonance is found to be generally substantially from 21 to 28 percent. This shows that in comparison with the existing viscous fluid damper in which the non-magnetic piston shown in FIG. 1 is used, owing to the application of the magnetic field, a larger attenuation effect can be obtained.

According to the invention, a piston (slider) of a damper in which the magnetic fluid is used is formed of a laminated body of a paramagnetic substance and a non-magnetic substance with the non-magnetic substance at both ends thereof, and thereby particles in the magnetic fluid can be suppressed from settling.

Furthermore, in the case of the piston being formed into a laminated body of the paramagnetic substance and the non-magnetic substance, when a progressive magnetic field is applied from an electromagnet, in comparison with the application of a static magnetic field, a larger attenuation effect can be obtained.

What is claimed is:

1. A damper with a magnetic fluid in which magnetic particles are uniformly dispersed, comprising:
   a vessel that accommodates a magnetic fluid;
   a slider in the vessel; and
   an electromagnet that externally applies a magnetic field to the magnetic fluid;
   wherein the slider is made of alternately laminated bodies of magnetic and non-magnetic substances with more than one layer of magnetic material and with the non-magnetic substance at both ends thereof and to which the magnetic particles in the magnetic fluid uniformly stick.

2. A damper as set forth in claim 1:
   wherein a magnetic field that is applied from the electromagnet is a progressive magnetic field.

* * * * *